US008363590B2

(12) United States Patent
Mathews et al.

(10) Patent No.: US 8,363,590 B2
(45) Date of Patent: *Jan. 29, 2013

(54) PHYSICAL LAYER REPEATER WITH ROAMING SUPPORT BASED ON MULTIPLE IDENTIFIERS

(75) Inventors: Mark Mathews, Melbourne, FL (US); Lawrence Wayne LaMont, Jr., San Diego, CA (US); Kenneth M. Galney, Satellite Beach, FL (US); James A. Proctor, Jr., Melbourne Beach, FL (US)

(73) Assignee: QUALCOMM Incorporated, San Diego, CA (US)

( * ) Notice: Subject to any disclaimer, the term of this patent is extended or adjusted under 35 U.S.C. 154(b) by 850 days.

This patent is subject to a terminal disclaimer.

(21) Appl. No.: 12/293,796

(22) PCT Filed: May 31, 2007

(86) PCT No.: PCT/US2007/012805
§ 371 (c)(1),
(2), (4) Date: Nov. 26, 2008

(87) PCT Pub. No.: WO2007/143010
PCT Pub. Date: Dec. 13, 2007

(65) Prior Publication Data
US 2010/0165910 A1 Jul. 1, 2010

(51) Int. Cl.
*H04J 3/08* (2006.01)
(52) U.S. Cl. .......................................... 370/315; 709/230
(58) Field of Classification Search .................. 370/315; 709/230
See application file for complete search history.

(56) References Cited

U.S. PATENT DOCUMENTS

| 7,756,473 | B2 * | 7/2010 | Seo et al. ..................... 455/22 |
| 2004/0196819 | A1 | 10/2004 | Lin et al. |
| 2005/0073968 | A1 | 4/2005 | Perlman |
| 2005/0256963 | A1 * | 11/2005 | Proctor Jr. et al. ............. 709/230 |
| 2006/0098592 | A1 * | 5/2006 | Proctor Jr. et al. ............. 370/315 |

FOREIGN PATENT DOCUMENTS

| CN | 1720755 A | 1/2006 |
| JP | 2003143156 A | 5/2003 |
| JP | 2006510326 | 3/2006 |

OTHER PUBLICATIONS

International Search Report and Written Opinion—PCT/US07/012805, International Search Authority—European Patent Office—Dec. 7, 2007.

* cited by examiner

*Primary Examiner* — Jianye Wu
*Assistant Examiner* — Wanda Z Russell
(74) *Attorney, Agent, or Firm* — Linda G. Gunderson

(57) ABSTRACT

An exemplary method (600, 700) and apparatus (800) are provided for generating a modified protocol message (414, 423 a, 423b, 424). In some embodiments, a physical layer repeater conducts a repeating operation including receiving a modified protocol signal on a first channel and retransmitting a modified version of the modified protocol signal on a second channel. An exemplary physical layer repeater can include a transceiver (810), a baseband modem (822), and a processor (821) configured to demodulate the modified protocol signal to obtain a first identifier and a first channel identifier and a unique identifier in a modified portion of the signal. The unique identifier and a second channel identifier are retransmitted in a modified version of the signal on the second channel.

31 Claims, 8 Drawing Sheets

PHYSICAL LAYER REPEATER WITH ROAMING SUPPORT BASED ON MULTIPLE IDENTIFIERS

FIELD OF THE INVENTION

The present invention relates generally to physical layer repeaters and more specifically to transmitting multiple identifiers in multiple beacon frames to support client roaming.

BACKGROUND OF THE INVENTION

Because of the increasing popularity of unrestrained access to broadband services by, for example, portable computing devices, there is an increasing need to extend the range of nodes such as access points associated with wireless networks, including but not limited to WLANs and wireless metropolitan area networks (WMANs) described and specified, for example, in the 802.11, 802.16 and 802.20 standards. The effective proliferation of wireless networks depends heavily on sustaining and increasing performance levels as user demands increase and supporting normal user activities such as movement or "roaming" within coverage areas while preserving connection integrity and quality of service (QoS) parameters.

One common practice in the mobile wireless industry to increase the range of wireless systems is through the use of repeaters. Various repeaters are known in the art operating at layer 1, commonly referred to as the physical layer (PHY), or above layer 1. Operation of a repeater at layers above layer 1, however, can cause significant performance issues when time sensitive data or data associated with high bandwidth applications is being transported by the network or can give rise to other modified in conventional layer 2 or higher operation, security features can be compromised along with a reduction in the overall ease of use.

In particular, an 802.11 repeater can extend the range of a given 802.11 Basic Service Set (BSS) by performing a cross-channel repeating function at the baseband level with little or no signal modulation/demodulation. The benefit of such a simplified approach is that repeating is performed in a very fast, low latency manner, while minimizing the overall silicon requirements for the underlying circuitry, thus providing a relatively inexpensive product solution. It will be appreciated that such repeater solutions works quite well for relatively fixed client stations with RF "visibility" to one of the Access Point (AP) or the repeater node, but not both.

Problems can arise however when the client has visibility to both the AP and the repeater node. In particular, a protocol-related problem arises when clients have clear visibility to both the AP and the repeater node during initialization or when roaming is imminent based on, for example, repeating a beacon frame having an identifier associated with the AP on a channel different from the designated channel. To better understand the problem, it should be noted that a typical repeater, as part of the repeating operation, will repeat an identifier associated with the AP, commonly referred to as the basic service set identifier (BSSID), on a channel other than the original transmit channel associated with the AP. By broadcasting the BSSID of the AP on a channel other than the original channel, one of the basic assumptions of the 802.11 protocol is violated. It should be noted that the basic rules of the protocol are encoded into virtually all 802.11-compliant stations implementations and rely on the uniqueness of the BSSID for identifying the BSS associated with a single channel. As will be appreciated, if only one of the AP or the repeater is visible to the client, the client can operate satisfactorily without knowledge of the protocol violation. If, on the other hand, the client can receive the beacon frame from both the AP and the repeater, problems can ensue as will be described herein below.

To understand the impact of violating the BSSID channel uniqueness assumption, it should be appreciated that in accordance with protocol operation, a table is generally kept of BSSID information including the channel information. Thus, during, for example, the building of a table of known BSSIDs, a table entry for a given BSSID will be created and associated with the first channel that the BSSID is received from. If the same BSSID is received on a different channel, the table entry will be subsequently updated or overwritten with the new channel information. The effect of overwriting the table entry will be to hide the original BSSID channel preventing the roaming client from scanning for optimal channel. The ultimate effect is that the roaming client will always join the BSSID/channel that was scanned most recently, never having the ability to compare additional BSSID/channels to determine which BSSID/channel is a better choice.

It would be desirable therefore for a physical layer repeater that can address and resolve the above identified problems and issues. Resolving these issues in such an exemplary repeater would preferably not result in substantial additional costs or complexity. Further the resolution of the above identified issues should be consistent with continued support of protocol operation, for example, in accordance with the 802.11 protocol or other protocols.

SUMMARY OF THE INVENTION

The above identified problems and other problems can be solved by various exemplary methods, procedures and configurations as described herein in accordance with various exemplary embodiments.

In one embodiment, a physical layer repeater can conduct a physical layer repeating operation including, for example, receiving a modified protocol signal, such as a beacon frame or probe response, on a first channel associated with an access point (AP) and retransmitting a modified version of the protocol signal on a second channel. The exemplary physical layer repeater can include a transceiver, a baseband modulator/demodulator, commonly referred to as a modem coupled to the transceiver, and a processor that is coupled to the baseband modem. The processor can be configured to demodulate the modified protocol signal to obtain a first identifier associated with the AP and the first channel, such as the channel on which the protocol message is received from the AP in an unmodified portion thereof. A second, unique identifier can be demodulated, which is a unique identifier that can be assigned by the AP, in a modified portion of the modified protocol message. It will be appreciated that an unmodified protocol message would not contain the additional identifier, which, as will be explained provides advantages in situations where both the AP and repeater are "visible" that is, are within range of the client station or STA. The information from the modified portion of the modified protocol message, such as the second identifier can be retransmitted on the second channel, while the retransmission of the first identifier on the second channel can be suppressed or otherwise prevented.

It will further be appreciated that the physical layer repeater can be further configured to cause the AP to transmit the modified protocol signal by notifying the AP that the physical layer repeater can process the modified protocol signal by, for example, sending a series of probe requests or the like. In the situation where the modified protocol signal includes a beacon frame, the modified portion will then include a unique BSSID such as $BSSID_{repeater}$ that can be used to establish an additional virtual network. In addition, the modified portion can include an invalid information element (IE) such as IE=0 to notify the repeater node that the AP has the capability to send modified protocol messages. Still further, the first identifier can include a BSSID associated with the AP and an information element (IE) associated with the first channel, while the second identifier can include a unique $BSSID_{repeater}$. In the case where the repeater sends probe requests, the modified protocol signal can include a probe response and the modified portion thereof can include the unique $BSSID_{repeater}$ and an invalid information element (IE).

In still other embodiments, a method is provided for controlling a wireless network operating in accordance with a protocol, such as an 802.11 protocol. The exemplary method can include transmitting a beacon frame, a probe response, or the like protocol message, on a first channel from a node in the network, such as an access point (AP). A modified portion of the message can be modified to deviate from the protocol, for example, by containing additional fields or the like. The message can contain, in an unmodified portion, control information and a first identifier associated with the node and a first channel identifier associated with the first channel. In the modified portion, the message can include a untie identifier associated with repeating the message by a repeater node repeating the control information on a second channel. The message can be received on the first channel at the repeater node and a modified version retransmitted on the second channel. It should be noted that the second channel is necessarily different from the first channel such that the modified version of the message contains the unique identifier and a second channel identifier associated with the second channel. The original information transmitted in the protocol message can be suppressed such that the modified version of the protocol message does not contain the first identifier associated with the node and the first channel identifier associated with the first channel.

The node, such as the AP, can be notified that the repeater node can process the protocol message so as to cause the node to transmit the protocol message in the first instance. The modified portion of the protocol message, such as the beacon frame or probe response, can include a unique identifier, such as $BSSID_{repeater}$, and the first identifier can include a BSSID associated with the AP and an information element (IE), such as a channel identifier, associated with the first channel.

It will be appreciated that in order to, for example, facilitate detection that the node or AP can transmit modified messages, the modified portion of the beacon frame or probe response can include an invalid information element (IE) and thus the repeater node can detect the invalid IE and thereby be notified that the node is configured to transmit the modified portion of the beacon frame or probe response.

In still other embodiments, a method is provided for generating a modified protocol message for controlling a repeating operation in a wireless network operating in accordance with a protocol, such as an 802.11 protocol. The modified protocol message can include a modified portion and an unmodified portion. In accordance with various embodiments of the exemplary method or procedure, the unmodified portion of the modified protocol message is formed to contain a first identifier associated with a first node, such as an access point (AP), and a first channel identifier associated with a first channel. The modified portion of the modified protocol message is formed such that the modified protocol message deviates from the protocol by containing a unique identifier and a modified information element (IE).

A modified version of the modified protocol message can be formed for retransmission during the repeating operation. The modified version of the modified protocol message including the unique identifier and second channel identifier associated with a second channel while excluding the first identifier and the first channel identifier. It will be appreciated that in some embodiments, the modified protocol message is formed if a request is received at the first node indicating that the repeating node can process the modified protocol message. Further, the repeating node can be informed that the first node can send the modified protocol message, in other words has the capability to send modified protocol messages, by detecting the modified IE. In various embodiments, the modified protocol message includes a modified beacon frame, a modified probe response, or the like.

In still other embodiments, additional protocol messages, such as beacon frames and probe responses can be sent by the AP containing different additional unique identifiers to support, for example, different virtual networks. When the repeater and AP have established that they are capable of operating in the above described manner, the repeater can then conduct repeating operations including retransmission of the additional protocol messages in a physical layer mode for fast operation.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF THE INVENTION

Figure 1:
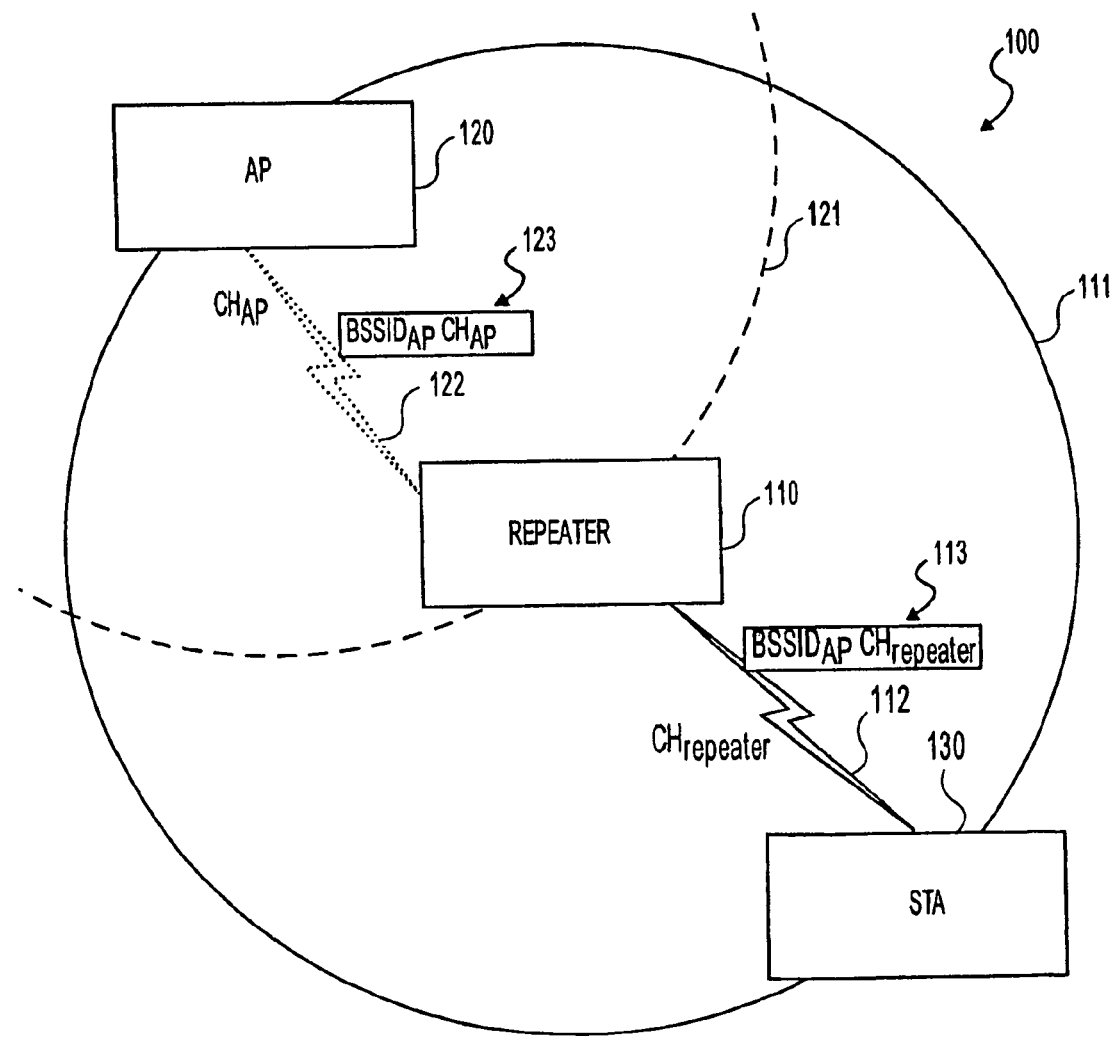
FIG. 1 is a diagram illustrating an exemplary repeater environment including an access point (AP) and a client station (STA).

In accordance with various embodiments, exemplary repeaters such as 802.11 repeaters can extend the range of a given 802.11 Basic Service Set (BSS) by performing a cross-channel repeating function at the baseband level with little or no signal modulation/demodulation resulting in very fast, low latency repeating while minimizing the silicon circuitry requirements, and providing a relatively inexpensive product solution.

To better understand the impact of the problems described above in the art, common station initialization and roam procedures are described herein below. At initialization-time or when a roam or BSS transition is indicated, a typical 802.11 station is configured to perform the following sequence of actions. First, a channel scan is performed to "sweep" the available channels. The exemplary receiver can be programmed to listen on each channel for a specified dwell time to build a table of known BSSs by listening for an 802.11 beacon frame and, optionally, a probe-response frames. The channel sweep is commonly implemented by stepping through the supported channel list from the lowest to highest channel number. The known BSS table is commonly implemented as a simple linear table populated in the order of receipt of frames received from the APs in the environment, or as a hash-table using the BSSID as the hash key. The table normally contains one entry per BSSID. If more than one frame is received from a given BSSID, then the table entry for that BSSID is overwritten or amended.

Second, after the scan is complete, the scan results are evaluated and compared against a user or system configuration to determine if any of the BSSs are candidates for an association attempt. In other words the entries are evaluated to determine whether they possess the desired SSID and security settings. If no BSSs are candidates, the first procedure can be repeated. If more than one BSS is a candidate, then the BSS with the best RF characteristics such as the highest RSSI is selected.

After a single BSS is selected, a join request is issued to the MAC using channel information from the received frames in the first step. Based on current security configuration, the requesting node attempts authentication. If authentication succeeds, an association is attempted by performing an association frame exchange. Additional authentication and key exchange can be attempted and layer-3 address acquisition and higher layer configuration can be conducted. It will be appreciated that if any of the above steps fails, the first step can be repeated and scanning can be resumed or repeated.

While the above noted procedure is commonly used to establish an association between a station and an AP, it will be appreciated that there are many changes and optimizations that can be a part of a given implementation. As noted in the background section, while building a table of known BSSIDs, the table entry for a given BSSID will be written a first time for the first channel upon which the BSSID is received, and will then be then overwritten with BSSID information received on a different channel having the effect of 'hiding' the previous channel information from the scan results evaluation. Thus, the station will always join the BSSID/channel that was scanned most recently, never having the opportunity to compare all BSSID/channel combinations to determine which BSSID/channel is the best choice.

One solution is that two different BSSIDs must be used, such as the BSSID associated with the AP and a unique BSSID to be used on the repeater channel. Such a solution can be implemented using an 802.11 MAC that supports multi-BSSID operation or with an AP implementation with two radios. Since multi-BSSID operation is a feature that is increasingly available in 802.11 MAC implementations to support multi-SSID or "Virtual AP" applications, a multi-BSSID aware repeater implementation can provide a solution.

In various embodiments, an AP can be configured to support two or more BSSIDs for transmission in the environment. The AP can transmit a first BSSID and an additional unique BSSID, with beacons for both BSSIDs transmitted on the AP channel. Beacons having the additional unique BSSID can be transmitted with an intentionally invalid "DS Parameter Set" information element (IE) such as with a channel value=zero. The repeater node detects the BSSID associated with the AP and the additional unique BSSID in the beacons as they are being retransmitted and can prevents retransmission of beacons having the BSSID of the AP, and can fix the "DS Parameter Set" field of the beacon having the additional unique BSSID, for example by adding the repeater channel.

In still other embodiments, the AP can be configured to supports two or more BSSIDs as described, however, beacons having the additional unique BSSID are transmitted with "DS Parameter Set" configured for the appropriate channel such as the repeater channel. In the present embodiment, the repeater or repeaters and AP must initially coordinate such that the AP is aware of the repeater channel. Alternatively, the AP can assign repeater channels. The repeater node then need not perform detection or frame modification and can simply retransmits all frames on the appropriate channel. It should be noted that if STAs are configured to use the "DS Parameter Set" and current Rx channel as a drop-filter for frames used to populate the known-BSS table, then the unique BSSID should be dropped when scanning on the AP channel and the BSSID of the AP should be dropped when scanning on the repeater channel. Dropping the "off-channel" beacons should result in a correct "known BSS" table.

In still other embodiments as will be described, an AP can support two or more BSSIDs, such as the BSSID of the AP and an additional BSSID. In such an embodiment, valid beacons are only generated for the BSSID of the AP on the AP channel. The repeater will consume beacons having the BSSID of the AP and use them as a template for generating new beacons for the additional unique BSSID on the repeater channel. In some instances, in order to avoid scan table pollution, probe responses can be suppressed.

In accordance with various embodiments, coordination between the AP and the repeater node is required as is some modifications to, for example the IEEE 802.11 and WiFi protocols. The modifications allow the AP to announce that it is capable of operation in accordance with the exemplary procedures as described herein, allow the repeater to notify the AP of it's presence and current configuration, and allow the AP to provide additional unique BSSID and "DS Parameter Set" offset information in the beacons. The desired modification are implemented by customizing the "Information Elements" (IEs) in existing 802.11 management frames. The mechanism for defining and using custom IEs is an established part of the 802.11 standard (P802.11-REVma/D5.2 Mar. 2006, pp 136).

An exemplary AP can implement its portion of coordination using a first custom IE that is added to the end of the payload in every beacon:

TABLE 1

| Item: | EID (221) | Len | OUI | PID | Len | Flags | RepeaterInfo |
|---|---|---|---|---|---|---|---|
| Octets: | 1 | 1 | 3 | 1 | 1 | 1 | N * 14 |

In Table 1, EID is an Element Identifier, fixed value of 221 (0xdd), Len is the length of IE payload in bytes, OUI is an Organizationally Unique Identifier, assigned by the IEEE and unique for each registering organization and guarantees that vendors can define their own IEs without interfering with interoperability, PID is the Protocol Identifier and identifies which user-defined protocol this EE belongs to, Len: Length of the MXB protocol payload, Flags are bit flags and controls to support the protocol: where bits [0-2] are used to identify how many repeaters are currently being supported by the beaconing AP. All other bits are reserved and shall be set to zero, RepeaterInfo is information where if Flags[0-2] are non-zero, a sequence of Repeater Info fields will be present. In the present example, each RepeaterInfo field is 14 octets long as follows: Octet 0[8-6]: RepeaterInfo protocol version (currently zero), Octet 0[5-0]: RepeaterInfo payload length (currently 13 or 0x0d), Octets 1-6: Repeater MAC address, Octets 7-12: BSSIDX for this Repeater, Octet 13: Offset in octets of the "DS Parameter Set" IE in this beacon.

It will be appreciated that an AP can announce that it is custom protocol aware by including the custom EE in the payload of each basic beacon frame having the BSSID of the AP. If the AP is not aware of any compliant nodes, then there will be zero RepeaterInfo fields present in the IE.

When a repeater node identifies an aware AP and has finished its internal affiliation process such as configuration, channel sweep, and channel selection, the repeater can announce itself to the AP using a directed probe request frame. The directed probe request can be sent using DA="BSSIDAP" and SA="repeater's MAC address." The content of the probe request frame can be a valid probe request containing a zero length SSID, and a supported rate set of only 1 and 2 Mbps. The probe request can contain a custom IE using the following format:

TABLE 2

| Item: | EID (221) | Len | OUI | PID | Len | Flags | RepeaterConfig |
|---|---|---|---|---|---|---|---|
| Octets: | 1 | 1 | 3 | 1 | 1 | 1 | 7 |

In Table 2, all fields up to and including the Flags field are identical to the first custom IE of the beacon frame as shown and described in connection with Table 1. In addition the RepeaterConfig info includes Octet 0: repeater channel number, and Octets 1-6: repeater MAC address. The repeater can transmit the probe request frames at predetermined intervals until the repeater begins receiving beacons with its own MAC address in the RepeaterInfo field of the first custom IE in Table 1. After the repeater has received a beacon with its own MAC address present, the repeater may begin generating beacons on its repeater channel using the unique identifier $BSSID_{repeater}$. The repeater can continue to transmit the custom probe request frames. If the AP wishes to test for the loss of a given repeater, a timeout window is recommended.

It will be appreciated that some additional system-level settings may be required for the AP to support the multiple BSSID protocol. In particular, all beacon frames must be transmitted at either 1 Mbps or 2 Mbps, the DTIM interval must be one, and possibly other setting as will be appreciated.

In other embodiments, particularly where modification of the beacon information from the AP could cause information such as power control information to be lost, repeater can receive those frames and modify the type/subtype field to make them valid frames before transmitting on the repeater channel. Additionally, the Repeater must detect valid beacons and probe responses from the affiliated AP and suppress them. The AP will deliver beacon frames having unique identifiers and probe responses that have already been corrected for the repeating channel, therefore the modification of the beacon and probe response payload will not be necessary.

Referring now to FIG. 1, an exemplary repeating environment 100 is shown in which an access point (AP) 120 having a coverage area 121 for a wireless signal 122, can communicate a protocol message 123, such as a beacon frame or probe response, to a station (STA) 130 through a repeater 110 having a coverage area 111 for a wireless signal 112. It can be noted that the protocol message 123 is changed during repeating to protocol message 113 in that, while an identifier associated with AP 120 is preserved in protocol message 113, the channel is changed to that of the repeater through standard implementation of the protocol such as the 802.11 protocol in the repeater during a repeating operation.

Figure 2:
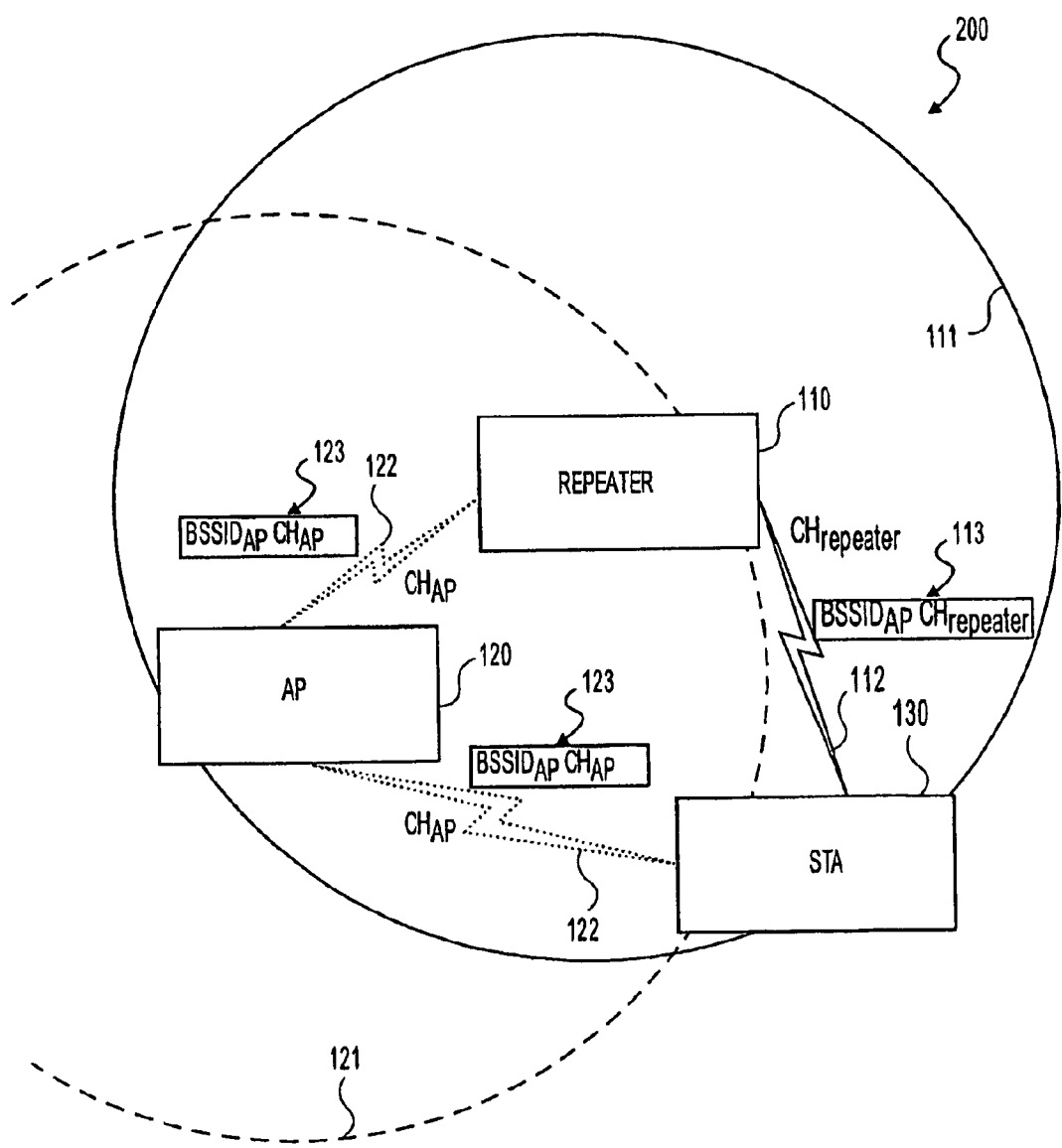
FIG. 2 is a diagram illustrating an exemplary scenario in a repeater environment involving receipt by a STA of a protocol message such as a basic service set identifier (BSSID) on multiple channels.

Problems can arise however, as shown in exemplary scenario 200 of FIG. 2. When STA 130 is within the respective ranges 111 and 121 of both repeater 110 and AP 120 for wireless signals 112 and 122. When AP 120 sends the protocol message 123 both repeater 110 and STA 130 receive it. In addition however, STA 130 receives the repeated version of the protocol message 123 as protocol message 113, which has been modified to include, in addition to the identifier associated with the AP 120, the repeater channel. As will be described in more detail hereinafter, such duplicate receipt by STA 130 of beacon frame information associated with AP 120 can cause a displacement of information related to which as between AP 120 and repeater 110 has the superior signal since the STA 130 will store only the most recent beacon frame information related to AP 120. Since, particularly in a roaming context, the STA 130 will need to connect with the strongest signal in the environment, which may be repeater 110 or AP 120, the displacement of the beacon frame information associated with the AP can lead to ineffective roaming management.

Figure 3:
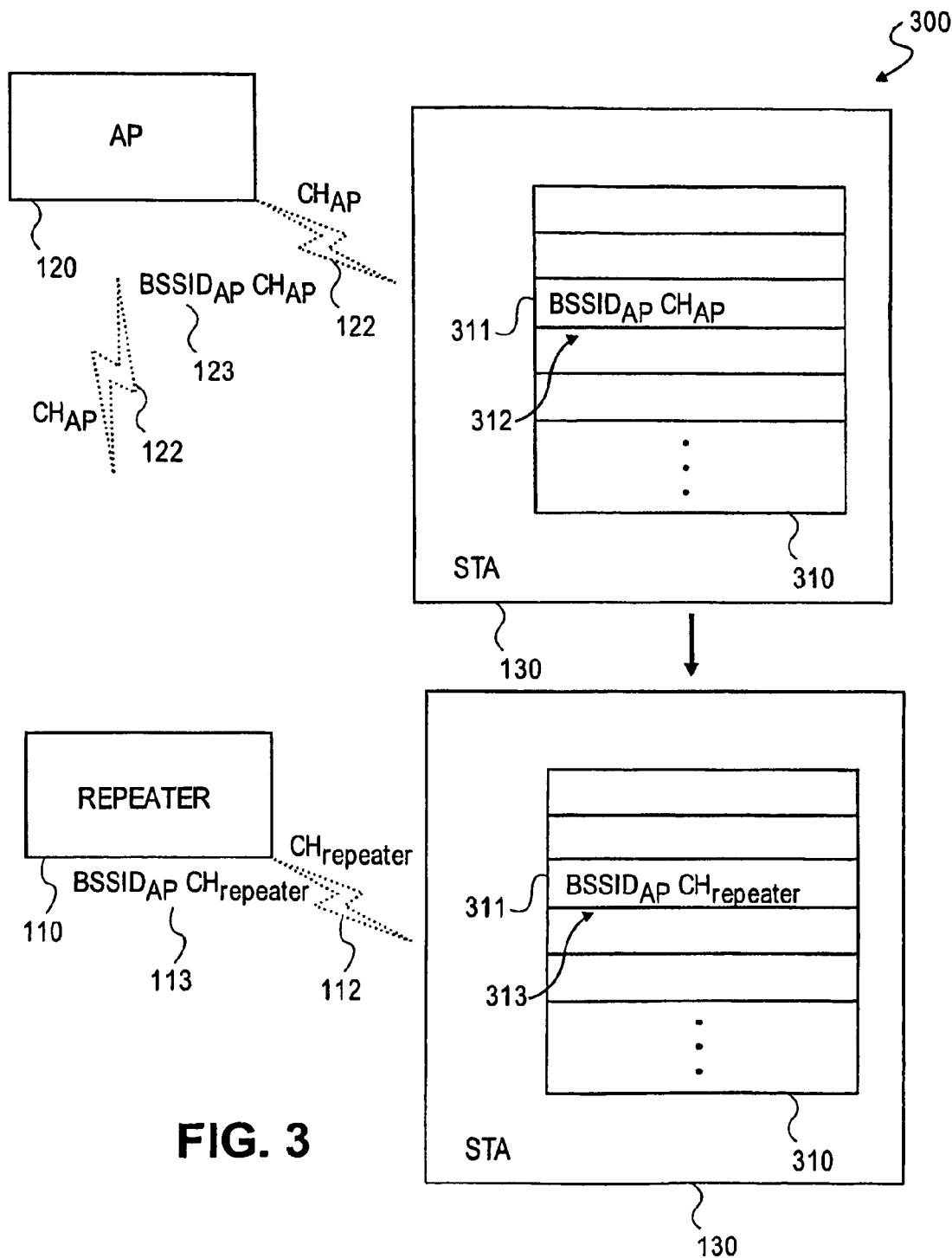
FIG. 3 is a diagram illustrating a tracking table in a STA and displacement of identifier information with subsequent identifier information from a different channel.

To better understand the nature of the displacement of beacon frame information, an exemplary scenario 300 is shown in FIG. 3. In the roaming context, STA 130 can be imagined as moving, for example, from the top of the page toward the bottom of the page. However, STA 130 in the present example is within range of both AP 120 and repeater 110. AP 120 will periodically transmit a protocol message 123, such as a beacon frame, as a wireless signal 122. When STA 130 receives a protocol message such as a beacon frame from AP 120, information 312 such as the BSSID and channel information associated with the AP 120 can be stored as an entry 311 in table 310, which can be configured in a memory or the like in STA 130. Similarly, repeater 110 will re-transmit versions of the protocol message 123 as protocol message 113 as a wireless signal 112.

When STA 130 receives a repeated version of the protocol message from repeater 110, information 313 such as the BSSID of the AP 120 and the channel information associated with the repeater channel are stored in the entry 311 in table 310, which displaces the information 312. It will be appreciated that the above described process can continue for any information received in protocol messages that is associated with the AP 120. The disadvantage of the above described displacement is that the table 310, rather than storing information about all possible access nodes, including the node associated with repeater 110 as a potential access node, the table 310 will store only the latest information associated with AP 120. The latest information includes information from protocol messages that were transmitted from AP 120 itself or messages that were transmitted from repeater 110 containing AP 120 identifier information, such as repeated protocol messages. In either case, the protocol procedures that are normally invoked during roaming, such as procedures for connecting with the access node having the best signal characteristics are defeated.

Figure 4:
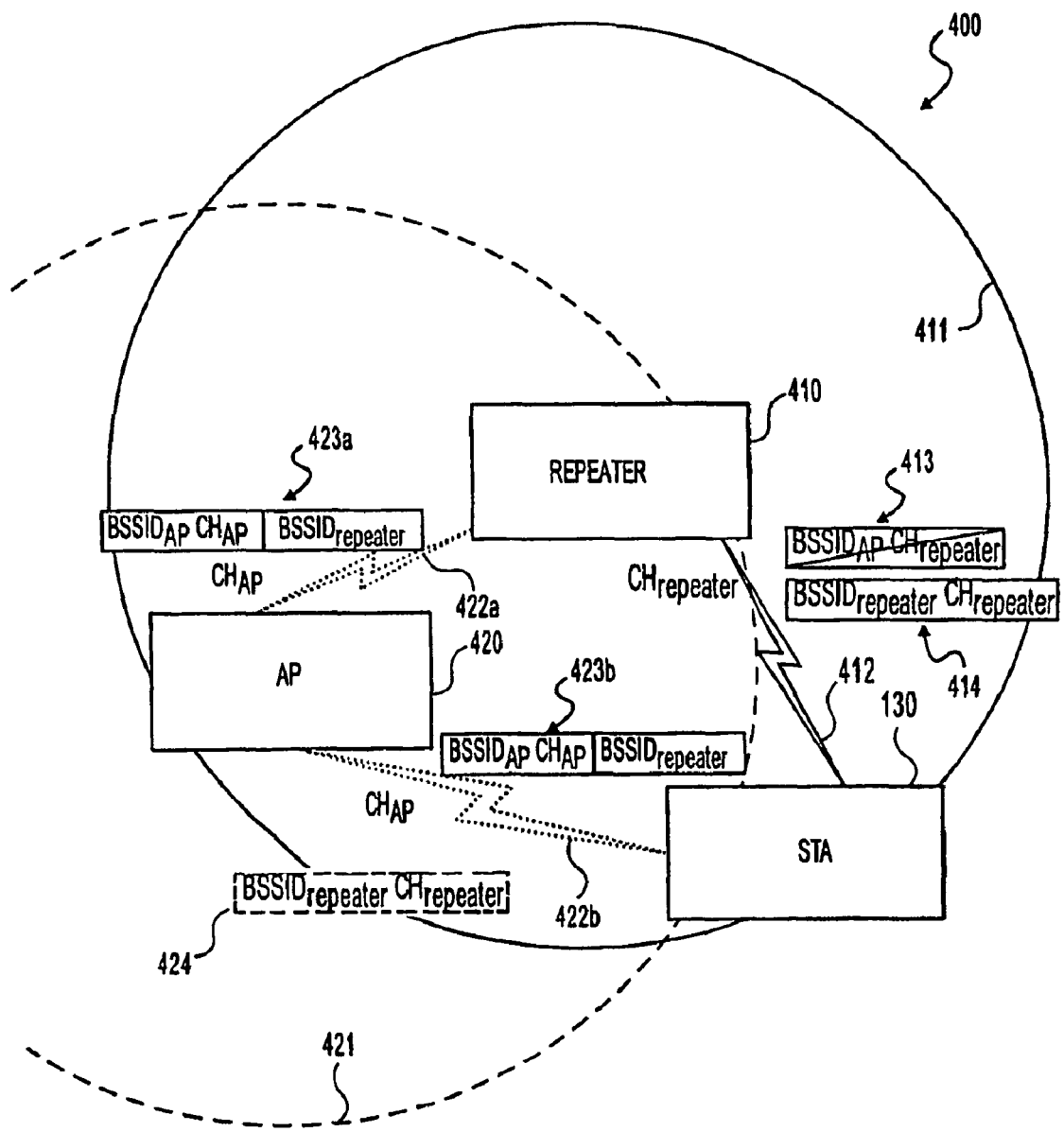
FIG. 4 is a diagram illustrating an exemplary repeater environment with a modified protocol message in accordance with various embodiments.

Accordingly, to avoid the above noted disadvantages, exemplary scenario 400 shown in FIG. 4, a modified protocol message can be sent. In the present example, AP 420 can be configured to transmit a modified protocol message, such as a modified beacon frame in addition to the normal beacon frame. While it will be appreciated that the modified protocol message is broadcast from AP 420, it is shown in two parts for illustrative purposes such as modified protocol message 423a directed to repeater 410 as a wireless signal 422a and modified protocol message 423b directed to STA 130 as a wireless signal 422b. Since STA 130 may not be equipped to process the additional information in the modified protocol message 422b, it will process the modified protocol message 422b as a normal protocol message and store an entry based on the BSSID and the channel information contained therein. However, when repeater 410 receives the modified protocol message 422a, it will recognize the modified portion thereof and replace the BSSID information associated with the AP and instead transmit a modified version of the protocol message that is modified to contain a unique $BSSID_{repeater}$, in other words a BSSID that will be retransmitted by the repeater 410 and the associated repeating channel. In this way, the additional BSSID and repeater channel of repeater 410 will be entered as a separate access node in STA 130 for roaming purposes.

It will be appreciated that in accordance with alternative embodiments, AP 420 can send an additional protocol message 424, such as a beacon frame or probe response message, or multiple additional messages, that contains the unique identifier $BSSID_{repeater}$ and the repeater channel information. The protocol message 424 can be sent, for example, after obtaining information about, for example, the repeater MAC address during a probe request or similar protocol message or request sent from the repeater to the AP as will be appreciated. It should be noted that the above described embodiment can support a number of virtual networks, that is, different BSSIDs that are associated with the same AP, such that the AP can manage communications directed to each unique BSSID as if it were a separate network. The number of BSSIDs that are capable of being supported will depend on the processing power of the AP and the number of repeaters in the environment. The AP will need as many as two unique BSSIDs per repeater to support independent virtual networks for all repeaters. It will further be appreciated that the AP and the repeater can communicate such that the AP can receive the repeated channel information selected by the repeater. Alternatively, the AP can assign a repeater channel, particularly in environments where the there is a background controller that is aware of all the nodes and interferers in the environments and can provide judgments about channel allocations and the like, which can be passed to the APs for ultimate assignment and use by repeaters.

In accordance with various exemplary alternative embodiments consistent with those described above, the AP can advertise that it is capable of operating in the inventive manner by using normal beacons having a modified information element that informs the repeater that the AP is capable of operating as described herein. The repeater can then select a repeater channel, and communicate the selected repeater channel back to the AP along with its address using, for example, a probe request message. The AP can then begin sending protocol message 424 such as an additional beacon message with a unique identifier such as $BSSID_{repeater}$, with the modified channel information on it.

Figure 5:
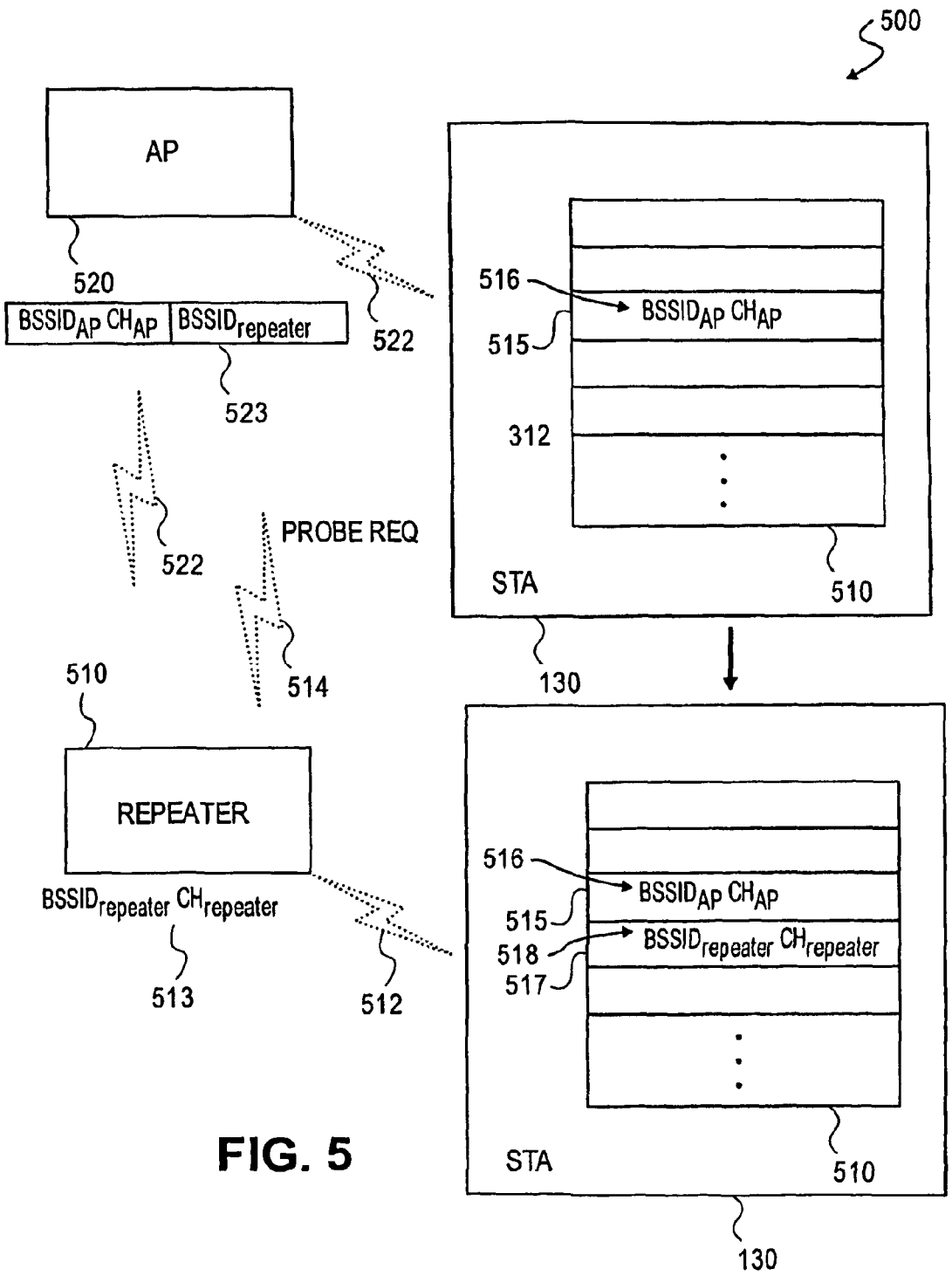
FIG. 5 is a diagram illustrating a tracking table in a STA and the addition of identifier information and subsequent identifier information with from a different channel in accordance with various embodiments.

As noted in connection with FIG. 4, STA 130 stores entries for both the repeater 410 and the AP 420 so that, under the protocol, the signal characteristics of each, along with any other access nodes within range, can be evaluated to determine which is the best at a given time, for example during roaming. An exemplary scenario 500 in FIG. 5 illustrates the above noted principles. AP 520 can broadcast a protocol message 523 over a wireless signal 522, which is received by STA 130 and associated information 516 can be stored as entry 515 in table 510. Repeater 510 can also receive the protocol message 523 and recognize the modified portion, which in the present example contains a unique identifier that will be re-transmitted on the channel associated with the repeater 510. It will be appreciated that in other embodiments, it is possible to send many additional beacon frame message with additional unique identifiers of nodes that are within range or likely to be within range of STA 130 as it roams. When repeater 510 receives the protocol message 523; it can construct a modified version of the protocol message for repeating purposes by substituting the appended identifier in place of the identifier for the AP 520. The resulting protocol message 513 can contain the additional unique identifier from the AP, such as the $BSSID_{repeater}$, and the repeating channel, which is generally different from the channel on which the original protocol message 523 was transmitted from the AP 520. Protocol message 513 can be broadcast on a wireless signal 512, which is the repeating channel. The associated information 518, such as the unique identifier, or $BSSID_{repeater}$, and the repeating channel information, can be stored as entry 517 in table 510. It should further be noted that the exemplary repeater 510 can stimulate the transmission of the protocol message by sending a request message 514 such as a probe request message. The protocol message 523 thus will be a probe response message.

Figure 6:
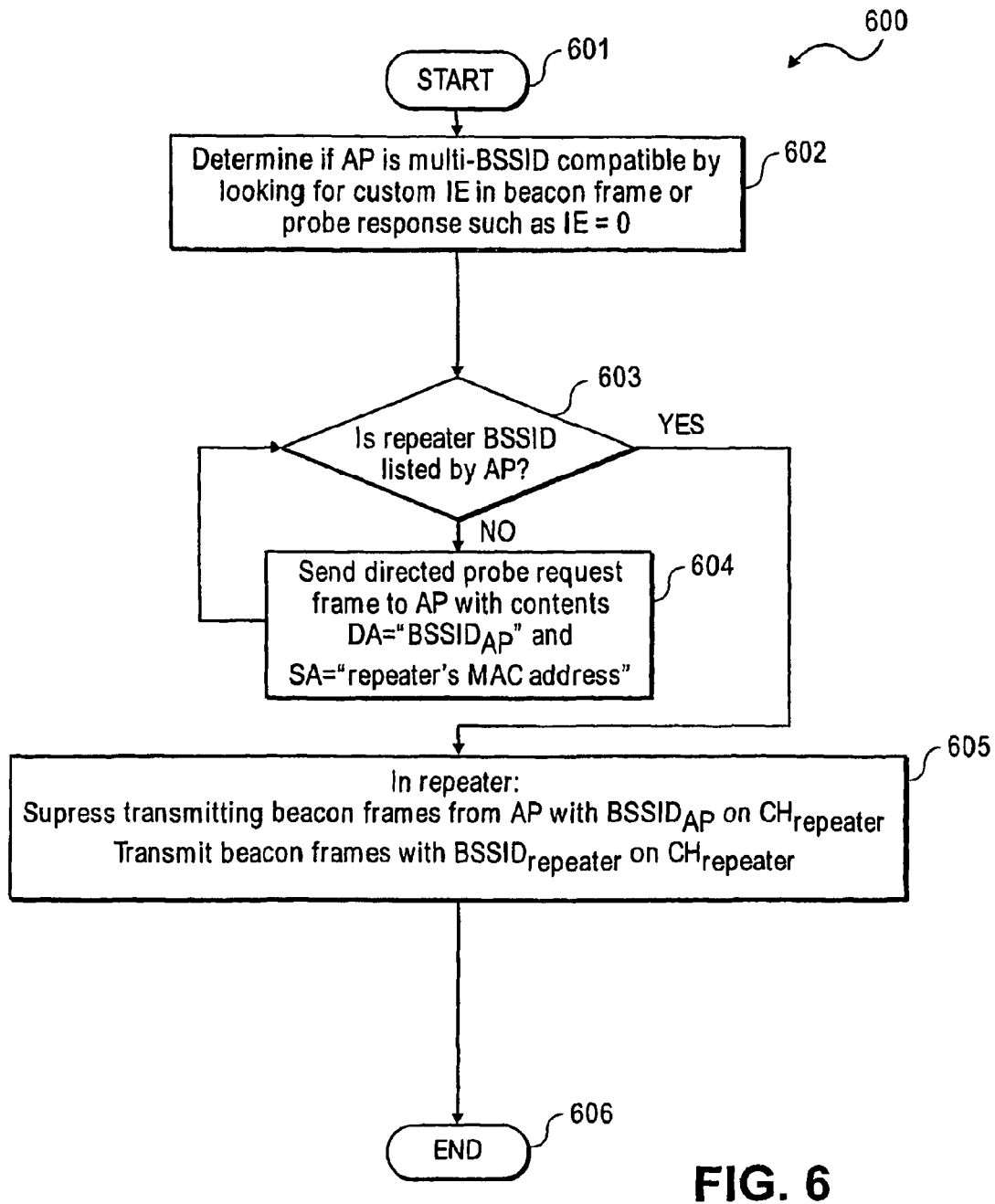
FIG. 6 is a flow chart illustrating an exemplary procedure in accordance with various embodiments.

In order to better understand operation in accordance with various embodiments, an exemplary method 600 is shown and described in connection with FIG. 6. After initialization or start up at 601, a node in a network such as a repeater node, can determine if another node such as an access point is capable of operating in accordance with a multiple BSSID protocol message by examining a protocol message such as beacon frame or probe request for a particular indicator such as an channel information element (IE) set to an undefined value such as IE=0 at 602. If a zero field is located then it can be determined whether the repeater BSSID is listed at 603. If a beacon frame message with the destination address of the repeater is not listed, the repeater can generate a directed probe request to the AP, for example with the contents set to DA="$BSSID_{AP}$" and the SA=<MAC address of repeater> at 604. Such action will stimulate in the AP an update of the AP information to include the repeater in subsequent modified protocol messages. When the repeater's address is seen in the modified protocol message, the repeater can suppress the retransmission of the protocol message information associated with the AP, and, instead transmit a version of the protocol message containing, for example, the unique identifier or $BSSID_{repeater}$ and channel information associated with the repeating channel at 605. While the exemplary procedure is indicated as ending at 606, it will be appreciated that the procedure can be repeated for every protocol message that is transmitted from an access point.

Figure 7:
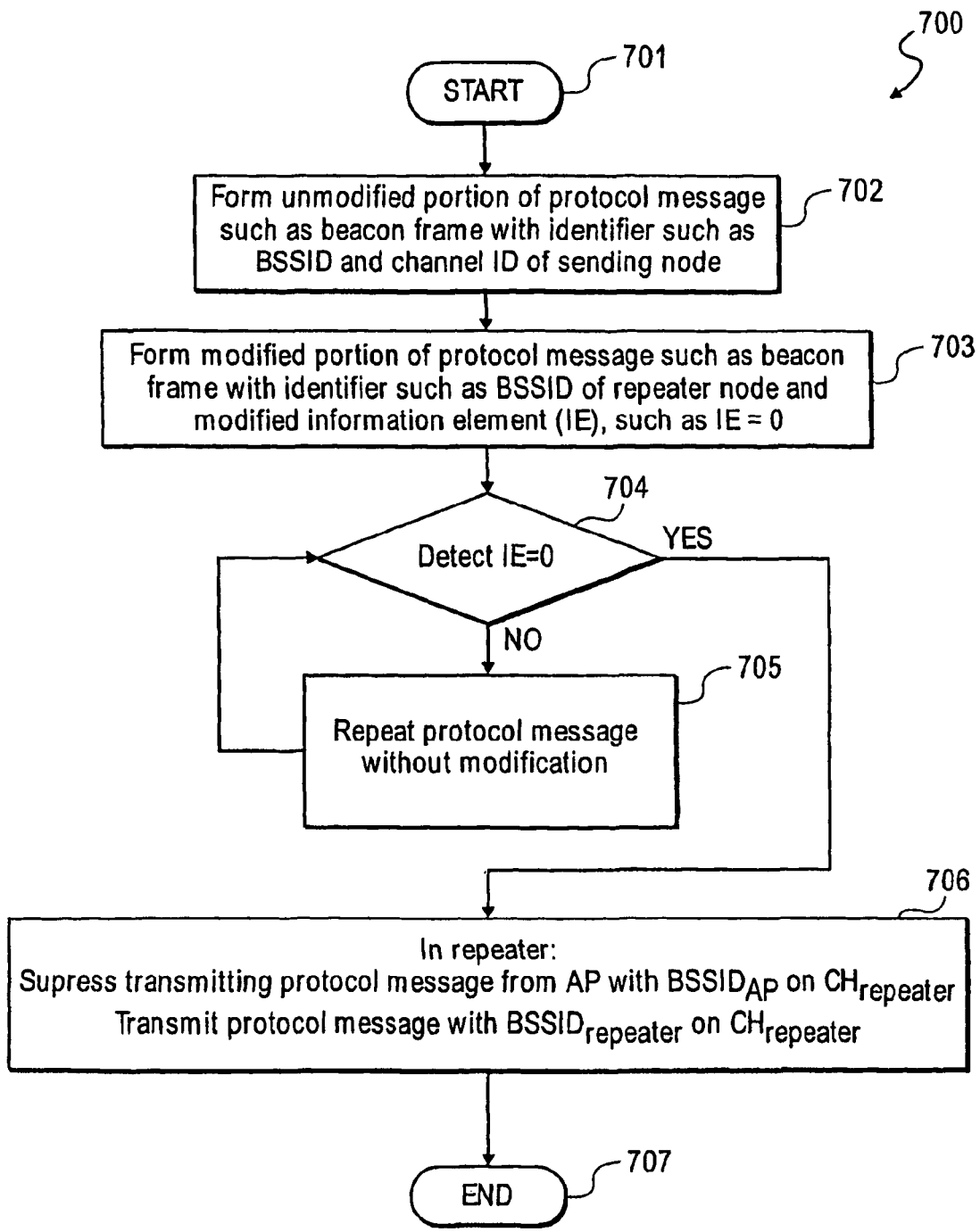
FIG. 7 is a flow chart illustrating another exemplary procedure in accordance with various embodiments.

In accordance with various alternative exemplary embodiments, another procedure 700 is shown and described in connection with FIG. 7 for the generation of the modified protocol message. After start at 701, an unmodified portion of the protocol message, such as a beacon frame or probe request, can be formed to include an identifier, such as a BSSID associated with the sending node, and channel information associated with the sending node's transmission channel at 702. A modified portion of the protocol message can be formed with a unique identifier, for example, $BSSID_{repeater}$, which can be drawn from a series of BSSIDs that are assigned to the sending node for virtual network purposes, and a modified information element (IE) set to zero at 703. If the modified IE is not detected at 704, the protocol message will be repeated without modification at 705. However, if the modified IE is detected at 704, the repeater can suppress the retransmission of the protocol message information associated with the AP, and, instead transmit a version of the protocol message containing, for example, a unique identifier such as $BSSID_{repeater}$ and channel information associated with the repeating channel at 706. While the exemplary procedure is indicated as ending at 707, it will be appreciated that the procedure can be repeated for every protocol message that is transmitted from an access point.

Figure 8:
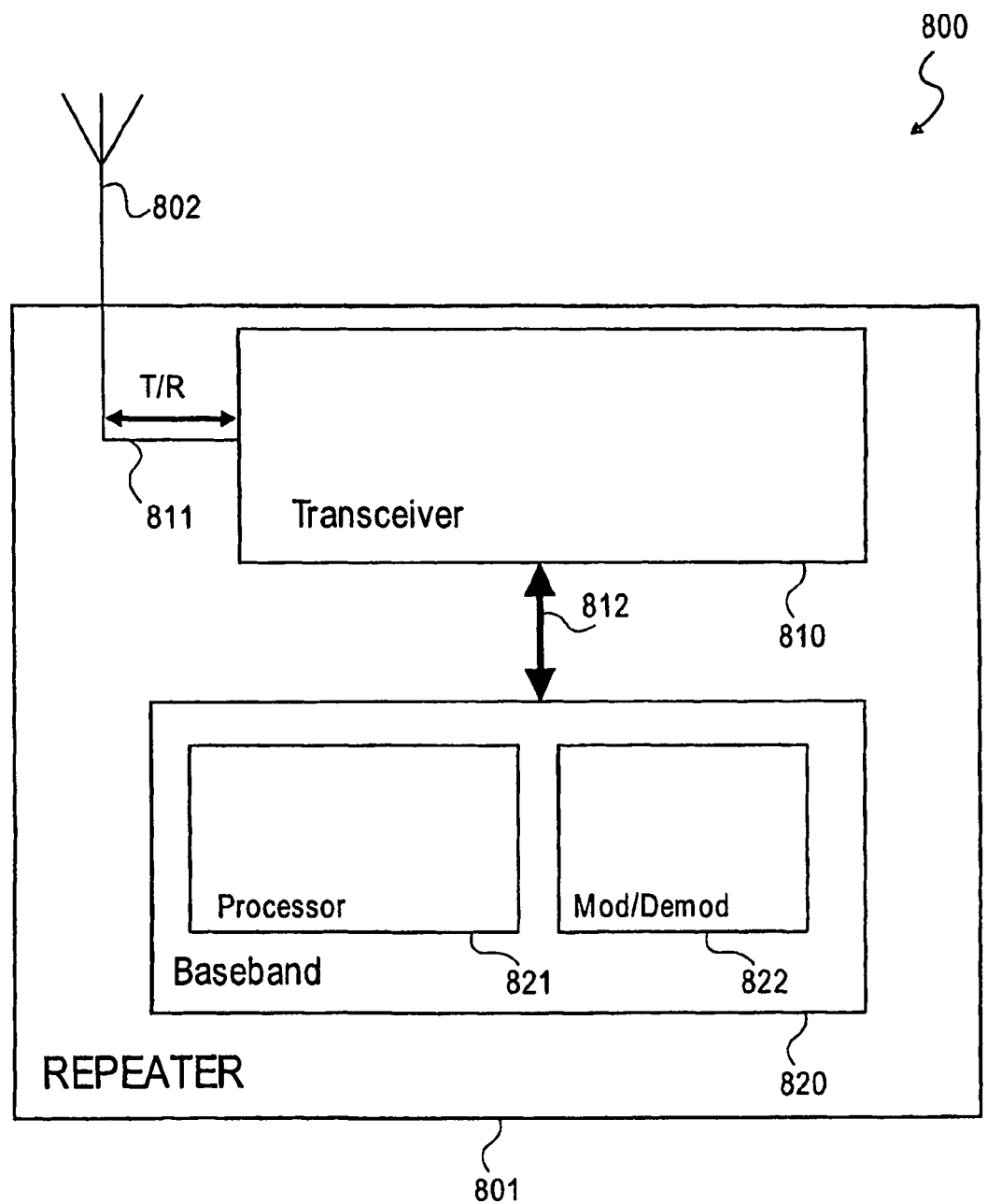
FIG. 8 is a block diagram illustrating portions of an exemplary physical layer repeater in accordance with various embodiments.

In accordance with still other embodiments, including possibly some or all of the features previously described, an exemplary apparatus 800 is shown in FIG. 8. The apparatus is shown in a simple form for illustrative purposes and, as will be appreciated, detail is omitted for clarity. Apparatus 801, which can be an exemplary repeater, can include an antenna 802 and a transceiver 810 that is coupled to the antenna through a bidirectional interface 811. The transceiver 810 can include RF circuitry, IF circuitry, conversion circuitry and the like, and is either integrated or can comprise sub-modules. A baseband module 820, which can be a digital baseband module can be connected to the transceiver 810 through a bus 812, which is preferably a high speed bus to accommodate fast signal processing. The baseband module 820 can further include a processor 821 and a modem 822 for demodulating protocol signals in order to extract information from protocol messages and to encode protocol messages for transmission as described herein. It will be appreciated that once an exemplary repeater has interacted with an AP in the radio environment, and the repeater and the AP have identified themselves as being capable of operating according to the above described protocol, the repeater can operate as a pure physical layer repeater by retransmitting without demodulation, the beacon frames containing the unique identifier $BSSID_{repeater}$ along with the repeater channel information.

Although several embodiments are shown herein for an exemplary physical layer repeater, the number of embodiments is for illustrative purposes and may not be exhaustive. It will be appreciated that changes and alterations to specific components, and the interconnections thereof, can be made by one of ordinary skill in the art without deviating from the intended scope of the present invention as defined by the following claims.

What is claimed is:

1. A physical layer repeater for conducting a physical layer repeating operation, the physical layer repeating operation including receiving a modified protocol signal on a first channel associated with an access point (AP), and retransmitting a modified version of the modified protocol signal on a second channel different from the first channel, the physical layer repeater comprising:
    a transceiver,
    a baseband modulator/demodulator (modem) coupled to the transceiver; and
    a processor coupled the transceiver and the baseband modem, the processor configured to:
        demodulate the modified protocol signal to obtain a first identifier associated with the AP and a first channel identifier associated with the first channel in an unmodified portion thereof and a unique identifier in a modified portion thereof; and
        retransmit the unique identifier and a second channel identifier associated with the second channel in a modified version of the modified protocol signal on the second channel and prevent the retransmission of the first identifier and the first channel identifier on the second channel.

2. The physical layer repeater according to claim 1, wherein the modified protocol signal includes a beacon frame.

3. The physical layer repeater according to claim 1, wherein the processor is further configured to cause the AP to transmit the modified protocol signal by notifying the AP that the physical layer repeater can process the modified protocol signal.

4. The physical layer repeater according to claim 1, wherein the processor is further configured to transmit a probe request signal so as to cause the AP to transmit the modified protocol signal.

5. The physical layer repeater according to claim 1, wherein the modified protocol signal includes a beacon frame and wherein the unique identifier includes a unique $BSSID_{repeater}$.

6. The physical layer repeater according to claim 5, wherein the modified protocol signal includes a beacon frame and wherein the modified portion includes an invalid information element (IE).

7. The physical layer repeater according to claim 1, wherein the modified protocol signal includes a beacon frame and wherein the modified portion includes a unique $BSSID_{repeater}$ and an invalid information element (IE).

8. The physical layer repeater according to claim 1, wherein the first identifier includes a BSSID associated with the AP and an information element (IE) associated with the first channel.

9. The physical layer repeater according to claim 1, wherein the unique identifier includes a unique $BSSID_{repeater}$.

10. The physical layer repeater according to claim 1, wherein the modified protocol signal includes a probe response and wherein the modified portion includes a unique $BSSID_{repeater}$.

11. The physical layer repeater according to claim 10, wherein the modified protocol signal includes a probe response and wherein the modified portion includes an invalid information element (IE).

12. The physical layer repeater according to claim 1, wherein the modified protocol signal includes a probe response and wherein the modified portion includes a unique $BSSID_{repeater}$ and an invalid information element (IE).

13. A method for controlling a wireless network operating in accordance with a protocol, the method comprising:
    transmitting a protocol message on a first channel from a node in the network, a modified portion of the protocol message modified so as to deviate from the protocol, the protocol message containing, in an unmodified portion, control information and a first identifier associated with the node and a first channel identifier associated with the first channel and, in the modified portion, a second identifier associated with a unique identifier assigned by the first node for repeating by a repeater node repeating the control information on a second channel; and
    receiving the protocol message on the first channel at the repeater node and retransmitting a modified version of the protocol message on the second channel different from the first channel such that the modified version of the protocol message contains the second identifier and a second channel identifier associated with the second channel, wherein the modified version of the protocol message does not contain the first identifier associated with the node and the first channel identifier associated with the first channel.

14. The method according to claim 13, wherein the protocol message includes one of a beacon frame and a probe response.

15. The method according to claim 13, further comprising notifying the node that the repeater node can process the protocol message so as to cause the node to transmit the protocol message.

16. The method according to claim 13, wherein the second identifier in the modified portion of the protocol message includes a unique $BSSID_{repeater}$.

17. The method according to claim 13, wherein the first identifier includes a BSSID associated with the AP and an information element (IE) associated with the first channel.

18. The method according to claim 13, wherein the modified portion of the protocol message includes an invalid information element (IE).

19. The method according to claim 13, wherein:
the modified portion of the protocol message includes an invalid information element (IE); and
the repeater node detects the invalid IE and is thereby notified that the node is configured to transmit the modified portion of the protocol message.

20. The method according to claim 13, wherein the protocol includes an 802.11 protocol.

21. A method for generating a modified protocol message for controlling a repeating operation by a repeating node in a wireless network operating in accordance with a protocol, the modified protocol message including a modified portion and an unmodified portion, the method comprising:
forming the unmodified portion of the modified protocol message to contain a first identifier associated with a first node and a first channel identifier associated with a first channel; and
forming the modified portion of the modified protocol message such that the modified protocol message deviates from the protocol, the modified portion containing a unique identifier and a modified information element (IE).

22. The method according to claim 21, further comprising forming a modified version of the modified protocol message for retransmission during the repeating operation, the modified version including the unique identifier and a second channel identifier associated with a second channel used by the repeating node, the modified version excluding the first identifier and the first channel identifier.

23. The method according to claim 21, wherein the modified protocol message is formed if a request is received at the first node indicating that the repeating node can process the modified protocol message.

24. The method according to claim 21, wherein the repeating node is informed that the first node can send the modified protocol message by detecting the modified IE.

25. The method according to claim 21, wherein the modified protocol message includes a modified beacon frame message.

26. The method according to claim 21, wherein the modified protocol message includes a modified probe response message.

27. The method according to claim 21, wherein the first node includes an access point (AP).

28. The method according to claim 22, wherein the protocol includes an 802.11 protocol.

29. A method for extending the range of a wireless local area network (WLAN), the WLAN including an access point (AP) connected to a wide area network, the AP communicating with at least one client unit using a protocol, the AP identifying which of at least two available frequencies is chosen for transmission in a first control parameter transmitted in a first protocol message and identifying additional information in a second control parameter transmitted in a second protocol message associated with the protocol, the method comprising:
setting the first control parameter transmitted by the AP so that the chosen one of the at least two available frequencies corresponds to an identifier associated with the AP and a first channel upon which the first protocol message is transmitted from the AP,
setting the second control parameter transmitted by the AP in the second protocol message transmitted on the first channel to include a unique identifier and a second channel of the at least two available frequencies that does not correspond to the first channel,
translating the second protocol message transmitted from the AP on the first channel and retransmitting the second protocol message on the second channel to the client unit.

30. The method of claim 29, further comprising:
providing an indication by the AP of a capability to set the second control parameter, and
receiving from the AP information associated with the second channel from a repeater.

31. The method of claim 30, wherein the receiving from the AP includes receiving a probe request from the repeater after the repeater has selected the second channel.

* * * * *

UNITED STATES PATENT AND TRADEMARK OFFICE
CERTIFICATE OF CORRECTION

| | | |
|---|---|---|
| PATENT NO. | : 8,363,590 B2 | Page 1 of 1 |
| APPLICATION NO. | : 12/293796 | |
| DATED | : January 29, 2013 | |
| INVENTOR(S) | : Mark Mathews et al. | |

It is certified that error appears in the above-identified patent and that said Letters Patent is hereby corrected as shown below:

On the Title Page

At Item (75) please amend the inventor name "Kenneth M. Galney" as follows. Please delete "Galney" and insert --Gainey--.

Signed and Sealed this
Fourteenth Day of July, 2015

Michelle K. Lee
*Director of the United States Patent and Trademark Office*